United States Patent [19]

Turner et al.

[11] Patent Number: 4,530,941

[45] Date of Patent: Jul. 23, 1985

[54] REACTION INJECTION MOLDED POLYURETHANES EMPLOYING HIGH MOLECULAR WEIGHT POLYOLS

[75] Inventors: Robert B. Turner; Richard D. Peffley; James A. Vanderhider, all of Lake Jackson, Tex.

[73] Assignee: The Dow Chemical Company, Midland, Mich.

[21] Appl. No.: 548,179

[22] Filed: Nov. 2, 1983

Related U.S. Application Data

[63] Continuation-in-part of Ser. No. 461,046, Jan. 26, 1983, abandoned.

[51] Int. Cl.$^3$ .................. C08G 18/14; C08G 18/32; C08G 18/48; C08G 18/65

[52] U.S. Cl. .................. 521/176; 252/182; 521/161; 521/163; 521/164; 521/167; 521/175; 521/902; 528/73; 528/76; 528/77; 528/78; 264/51; 264/328.6

[58] Field of Search ............... 252/182; 521/161, 163, 521/164, 167, 175, 176; 528/73, 76, 77, 78

[56] References Cited

U.S. PATENT DOCUMENTS

| | | | |
|---|---|---|---|
| 3,155,657 | 11/1964 | Bedoit, Jr. | 260/247 |
| 3,155,728 | 11/1964 | Lesesne | 260/584 |
| 3,161,682 | 12/1964 | Lesesne et al. | 260/584 |
| 3,179,606 | 4/1965 | Prescott et al. | 260/2.5 |
| 3,231,619 | 1/1966 | Speranza | 260/584 |
| 3,236,895 | 2/1966 | Lee et al. | 260/584 |
| 3,267,050 | 8/1966 | Kuryla et al. | 260/2.5 |
| 3,436,359 | 4/1969 | Hubin et al. | 260/2 |
| 3,558,529 | 1/1971 | Whitman et al. | 260/2.5 |
| 3,654,370 | 4/1972 | Yeakey | 260/584 B |
| 3,660,319 | 5/1972 | Yeakey | 260/2.5 AC |
| 3,666,788 | 5/1972 | Rowton | 260/465.5 R |
| 3,668,173 | 6/1972 | Wooster et al. | 260/32.6 N |
| 3,684,770 | 8/1972 | Meisert et al. | 260/75 NP |
| 3,714,128 | 1/1973 | Rowton et al. | 260/77.5 CH |
| 3,838,076 | 9/1974 | Moss et al. | 260/2.5 AQ |
| 3,847,992 | 11/1974 | Moss | 260/584 B |
| 4,048,105 | 9/1977 | Salisbury | 260/2.5 AC |
| 4,049,667 | 9/1977 | Mao et al. | 260/77.5 CR |
| 4,049,716 | 9/1977 | Collet | 528/60 |
| 4,070,530 | 1/1978 | Hobbs | 526/7 |
| 4,102,833 | 7/1978 | Salisbury | 521/159 |
| 4,107,106 | 8/1978 | Dunleavy et al. | 521/164 |
| 4,133,943 | 1/1979 | Blahak et al. | 521/163 |
| 4,246,363 | 1/1981 | Turner et al. | 521/163 |
| 4,269,945 | 5/1981 | Vanderhider et al. | 521/159 |
| 4,433,067 | 2/1984 | Rice et al. | 521/51 |
| 4,444,910 | 4/1984 | Rice et al. | 521/51 |

FOREIGN PATENT DOCUMENTS

| | | |
|---|---|---|
| 784293 | 4/1968 | Canada . |
| 863223 | 2/1971 | Canada . |
| 81701 | 11/1983 | European Pat. Off. . |
| 2751923 | 5/1978 | Fed. Rep. of Germany . |
| 1233614 | 5/1971 | United Kingdom . |
| 1534258 | 11/1978 | United Kingdom . |

OTHER PUBLICATIONS

"Investigation of Domain Structure in Urethane Elastomers by X-ray and Thermal Methods", C. E. Wilkes and C. S. Yusek, *J. Macromol. Sci. Phys.*, B7(1), pp. 157–175, 1973.

"Removable Polyurethane Encapsulants", K. B. Wischmann, G. L. Cessac and J. G. Curro, *J. of Elastomers and Plastics*, vol. 9, Jul. 1977, pp. 299–311.

"Cyanoethylated Polyoxypropylenepolyamines: Polymer Formers of Unique Reactivity", R. L. Rowton, *J. of Elastomers and Plastics*, vol. 9, Oct., 1977, pp. 365–375.

"The Bay Flex 110 Series—The New Generation of Rim Materials", W. A. Ludwico and R. P. Taylor, Sep. 26–30, 1977.

"The Properties of High Modulus Rim Urethanes", R. M. Gerkin and F. E. Critchfield, Sep. 26–30, 1977.

"X-Ray Investigations Concerning the Physical Structure of Cross-Linking in Segmented Urethane Elastomers", R. Bonart, *J. Macromol. Sci.-Phys.* B2(1), pp. 115–138, Mar. 1968.

*Primary Examiner*—Herbert S. Cockeram
*Attorney, Agent, or Firm*—J. G. Carter; G. C. Cohn

[57] ABSTRACT

Reaction injection molded polyurethanes prepared from a composition comprising (A) a relatively high molecular weight polyol, (B) a chain extender and (C) a polyisocyanate or polyisothiocyanate are improved by replacing a portion of the relatively high molecular weight polyol with an aminated or partially aminated polyoxyalkylene material.

24 Claims, No Drawings

REACTION INJECTION MOLDED POLYURETHANES EMPLOYING HIGH MOLECULAR WEIGHT POLYOLS

CROSS REFERENCE TO RELATED APPLICATION

This is a continuation-in-part of application Ser. No. 461,046 filed Jan. 26, 1983 abandoned.

BACKGROUND OF THE INVENTION

Reaction injection molded polyurethanes are well known in the art as described in a paper entitled "The Bayflex 110 Series—the New Generation of Rim Materials", by W. A. Ludwico and R. P. Taylor presented at the Society of Automotive Engineers Passenger Car Meeting, Detroit Mich., Sept. 26–30, 1977; a paper entitled "The Properties of High Modulus Rim Urethanes", by R. M. Gerkin and F. E. Critchfield presented at the above meeting; British Pat. No. 1,534,258 titled "Process for the Production of Elastomeric Polyurethane-Polyurea Moulded Products having a Compact Surface Skin" and a book by F. Melvin Sweeny entitled *Introduction to Reaction Injection Molding*, Technomics, Inc., 1979.

These systems employ, as chain extenders, diols, aromatic amines, cyanoethylated polyoxyalkylene amines and mixtures thereof.

It has been thought that as a general rule the aliphatic amines were too fast to be suitably employed in RIM urethane applications. Vanderhider and Lancaster in U.S. Pat. No. 4,269,945 discovered that low molecular weight aliphatic amine compounds could be employed as a part of the chain extender system when employed as a mixture with either or both of such materials as hydroxyl-containing materials and aromatic amines.

It has now been discovered that high molecular weight aminated polyols can be employed to enhance certain properties such as one or more of those selected from, for example, flexural modulus, tensile strength, tear strength, and the like in such RIM urethane systems usually without an unacceptable reduction in other properties of the polymer.

SUMMARY OF THE INVENTION

The present invention pertains to an improvement in molded polymer systems which systems employ a composition which comprises (A) at least one relatively high molecular weight hydroxyl-containing polyol;

(B) at least one chain extender; and (C) at least one polyisocyanate, polyisothiocyanate or mixture thereof;

the improvement residing in replacing at least a portion of component (A) with, as component (D), a material or mixture of materials having an average equivalent weight of at least 500, preferably from greater than 500 to about 3,000, most preferably from greater than about 500 to about 2,000 and which contains a plurality of oxyalkylene groups and at least one primary or secondary amine group per molecule with the proviso that when such material contains only one primary or secondary amine group per molecule, it also contains at least one other group containing a hydrogen atom reactive with an NCO and/or NCS group per molecule; and wherein:

(i) of the total number of hydrogen equivalents contributed by hydroxyl groups and amine groups in components (A), and (D) from about 25 to about 100, preferably from about 50 to about 100, most preferably from about 60 to about 100 percent of the hydrogen equivalents are derived from amine groups;

(ii) component (B) is present in quantities of from about 5 to about 400, preferably from about 15 to about 50, most preferably from about 20 to about 40 parts per 100 parts by weight of components (A) and (D); and (iii) the NCX index is from about 0.6 to about 1.5, preferably from about 0.7 to about 1.25 and most preferably from about 0.8 to about 1.10 with the proviso that when the system contains an NCX trimerization catalyst, the NCX index can be as high as about 5.

The term NCX index is the ratio of the total number of NCO and/or NCS equivalents to the total number of hydrogen equivalents contained in the formulation. Suitable groups containing hydrogen atoms reactive with NCO and/or NCS groups include, OH, SH, NH and the like.

The present invention also concerns a composition comprising:

(A) an active hydrogen-containing composition comprising (1) at least one material containing at least one primary or secondary amine group per molecule and has an average equivalent weight of at least 500, preferably from about 500 to about 3000, most preferably from about 500 to about 2000; and (2) optionally a polyol or mixture of polyols whose source of active hydrogen atoms is derived only from groups other than primary or secondary amine groups, has an average active hydrogen equivalent weight of at least 500 suitably from 500 to about 5000, preferably from about 1000 to about 3000, most preferably from about 1500 to about 2500; with the proviso that if polyol (A-1) has only one primary or secondary amine group per molecule, then it also has at least one other group reactive with an NCO and/or NCS group per molecule and wherein in component (A) from about 25 to about 100 percent of the active hydrogen equivalents contained therein are derived from amine groups; and (B) as a chain extender composition, one or more members selected from the group consisting of (1) at least one aliphatic amine-containing material having at least one primary amine group or a mixture of such materials, which material or mixture of materials has an average aliphatic amine hydrogen functionality of from about 2 to about 16, preferably from about 2 to about 12 and most preferably from about 4 to about 8 and an average aliphatic amine hydrogen equivalent weight of from about 15 to 500, preferably from about 40 to about 200 and most preferably from about 60 to about 150;

(2) at least one hydroxyl-containing material free of aliphatic amine hydrogen atoms or mixture of such materials, which material or material mixture has an average OH functionality of from about 2 to about 4, preferably from about 2 to about 3, and most preferably about 2; and an average OH equivalent weight of from about 30 to about 120, preferably from about 30 to about 80, and most preferably from about 30 to about 60;

(3) at least one aromatic amine-containing compound which is essentially free of aliphatic amine hydrogens and which contains at least 2 aromatic amine hydrogen atoms or a mixture of such materials; and (4) mixtures thereof; and wherein (i) when component (B) has an average equivalent weight of less than about 50, component (B) is present in quantities of from about 5 to about 60, preferably from about 15 to about 50, most preferably from about 20 to about 40 percent by weight of component (A);

(ii) when component (B) has an average equivalent weight of from about 50 to about 150, component (B) is present in quantities of from about 5 to about 90, preferably from about 15 to about 70, most preferably from about 20 to about 55 percent by weight of component (A);

(iii) when component (B) has an average equivalent weight of greater than about 150, component (B) is present in quantities of from about 5 to about 120, preferably from about 15 to about 100, most preferably from about 20 to about 85 percent by weight of component (A); and (iv) equivalent weight is the average molecular weight divided by the total number of hydrogen atoms attached to an oxygen atom or a nitrogen atom.

DETAILED DESCRIPTION OF THE PREFERRED EMBODIMENTS

The relatively high molecular weight hydroxyl-containing compounds which can be employed herein are those polyether polyols, polyester polyols and hydrocarbon derived polyols which are free of active amine hydrogen atoms and which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500 including mixtures thereof.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable such oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide(oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(-methylamino)diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable relatively high molecular weight polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol(1,4-bis-hydroxymethyl cyclohexane)2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Suitable high molecular weight polyols also include, hydrocarbon polyols such as, for example, hydroxy terminated polybutadiene rubbers commercially available from Arco Chemical Company as Poly B-D 2000X.

Other polyols which can be employed herein include polymer-containing polyols such as, for example, those disclosed in U.S. Pat. No. Re. 29,118 (Stamberger), U.S. Pat. No. Re. 28,715 (Stamberger), U.S. Pat. No. Re. 29,014 (Pizzini et al), U.S. Pat. No. 3,869,413 (Blankenship et al) and U.S. Pat. No. 4,390,645 (Hoffman et al) all of which are incorporated herein by reference.

Suitable materials containing amine groups include any of the above mentioned polyols, particularly the polyether polyols, which have been at least partially aminated. Suitable such aminated polyols and method for their preparation are described by Lesene and Godfrey in U.S. Pat. No. 3,161,682; by Speranza in U.S. Pat. No. 3,231,619; by Lee and Winfrey in U.S. Pat. No. 3,236,895; by Hubin and Smith in U.S. Pat. No. 3,436,359; and by Yeakey in U.S. Pat. No. 3,654,370 all of which are incorporated herein by reference.

The classical function, utility and definition of chain extenders in polyurethanes are suitably described in U.S. Pat. No. 3,233,025, col. 4, lines 5-28; U.S. Pat. No. 3,915,937, col. 1, lines 20-27 and 36-44; U.S. Pat. No. 4,065,410, col. 1, lines 42-44, col. 2, lines 20-21 and col. 4, line 60 to col. 5, line 41; U.S. Pat. No. 4,048,105, col.

1, lines 30-38 and col. 2, lines 4-13. All of the above are incorporated herein by reference.

Suitable hydroxyl-containing chain extenders which are free of aliphatic amine hydrogen atoms include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylenetriamine, mixtures thereof and the like.

Suitable aliphatic amine-containing chain extenders having at least one primary amine group which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof and the like.

Particularly suitable are the aminated polyoxypropylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which can be employed herein as a chain extender which is essentially free of aliphatic amine hydrogen atoms include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4"triamine, 4,4'-di-(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylene-bis(2,6-diisopropylaniline), mixtures thereof and the like.

Use of special mixtures of the chain extenders is fully described by Vanderhider and Lancaster in U.S. Pat. No. 4,269,945 which is incorporated herein by reference.

Suitable polyisocyanates include the organic aromatic and aliphatic polyisocyanates, polyisothiocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, mixtures thereof and the like.

Also suitable are organic aromatic polyisocyanates and the prepolymers and quasi-prepolymers prepared from such polyisocyanates and compounds having 2 or more active hydrogen atoms.

Suitable organic aliphatic polyisocyanates include, in addition to the hydrogenated derivatives of the above mentioned organic aromatic polyisocyanates, 1,6-hexamethylene diisocyanate, 1,4-cyclohexyl diisocyanate, 1,4-bis-isocyanatomethyl-cyclohexane, m- or p-tetramethylxylene diisocyanate, mixtures thereof and the like.

Also suitable are the corresponding polyisothiocyanates, and NCO or NCS terminated prepolymers or quasi-prepolymers prepared from such polyisocyanates and/or polyisothiocyanates and suitable active hydrogen containing materials. Suitable such prepolymers or quasi-prepolymers include those disclosed by Dominguez et al in U.S. Pat. No. 4,297,444 which is incorporated herein by reference.

The polymers can be prepared either in the presence or absence of a catalyst. Those polymers prepared from amine containing polyols do not usually require a catalyst although catalysts can be employed if desired. On the other hand, those polymers prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis(2-dimethylaminoethyl)ether, N-methylmorpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like in U.S. Pat. No.

4,126,741 (Carleton et al) all of which are incorporated herein by reference.

The zwitterions can also function as a catalyst for urethane formation i.e. the NCX—OH reaction.

If desired, the densities of the polyurethanes produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520, L-5320 and L-5340 commercially available from Union Carbide Corp.; and B-1048 commercially available from PH. Goldschmidt, AG., mixtures thereof and the like.

The polymers of the present invention may additionally contain, if desired, coloring agents, density reducing agents, reinforcing agents, mold release agents, fire retardant agents, fillers, modifiers and the like.

Suitable liquid and solid modifiers are disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) or ¼ inch (0.64 cm) and the like. Other particularly suitable fillers are mica, wollastonite, fumed silica, and the like.

The components which react to form the polyurethanes of the present invention can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for the RIM applications of the present invention include those disclosed in the aforementioned articles by Ludwico et al, Gerkin et al, British Pat. No. 1,534,258 and the book by F. Melvin Sweeney all of which are incorporated herein by reference.

To prevent the solidifying mass from adhering to the mold surface, it may be necessary to precoat the mold surface with a film of a suitable mold release agent such as, for example, hydrocarbon wax or a polysiloxane preparation or a polytetrafluoroethylene coating, or employ an internal mold release agent in the composition.

When injecting a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The following examples are illustrative of the present invention and are not to be construed as to limiting the scope thereof in any manner.

The term polyol which follows means those materials having hydrogen atoms attached to an oxygen or nitrogen atom.

The term total hydrogen equivalent weight means the value derived from dividing the average molecular weight by the total number of hydrogen atoms attached to an oxygen atom and/or a nitrogen atom.

Following is a list of materials employed in the examples and comparative experiments.

POLYOL A is the reaction product of glycerine and propylene oxide at a molar ratio of about 1 to 6 respectively and having an equivalent weight of about 150.

POLYOL B is the reaction product of polyol A and propylene oxide and subsequently end-capped with about 18% ethylene oxide by weight. The polyol has an OH equivalent weight of about 1598.

POLYOL C is an aminated polyoxypropylene glycol having an average molecular weight of about 2000 and an average total amine hydrogen equivalent weight of about 500 which is commercially available from Texaco Chemicals as JEFFAMINE D-2000.

POLYOL D is a polyoxypropylene glycol having an average hydroxyl equivalent weight of about 1000.

POLYOL E is an aminated polyoxypropylene triol having an average molecular weight of about 5000 and a degree of amination of about 82 percent. This polyol has an average total hydrogen equivalent weight of about 991.

POLYOL F is an aminated polyoxypropylene triol having an average molecular weight of about 5000 and a degree of amination of about 30 percent. This polyol has an average total hydrogen equivalent weight of about 1250.

POLYOL G is an aminated polyoxypropylene triol having an average molecular weight of about 5000 and a degree of amination of about 50 percent. This polyol has an average total hydrogen equivalent weight of about 1111.

POLYOL H is the reaction product of polyol A and propylene oxide and subsequently end-capped with about 14% ethylene oxide by weight. This product has an average OH equivalent weight of about 1598.

CHAIN EXTENDER A is ethylene glycol which has an average hydroxyl equivalent weight of 31.

CHAIN EXTENDER B is diethyltoluenediamine having an average total amine hydrogen equivalent weight of 44.5 commercially available from Mobay as E-505.

POLYISOCYANATE A is a uretoneimine modified 4,4'-diphenylmethane diisocyanate having an average NCO equivalent weight of about 143, commercially available from Rubicon Chemicals Incorporated as RUBINATE LF-168.

POLYISOCYANATE B is a quasi-prepolymer prepared from 4,4'-diphenylmethane diisocyanate and a low molecular weight propylene glycol diol having an average NCO equivalent weight of about 179. This material is commercially available from Rubicon Chemicals Incorporated as Rubinate LF-179.

CATALYST A is an organotin catalyst commercially available from Witco Chemical as FOMREZ UL-28.

CATALYST B is a 33% solution triethylene diamine in dipropylene glycol commercially available from Air Products as DABCO 33LV.

CATALYST C is lead octoate commercially available from Tenneco as Nenodex.

CATALYST D is an organotin catalyst, dibutyltin dilaurate, available from M&T Chemical Co. as T-12.

The following examples and comparative experiments were prepared by the following general procedure.

The components commonly referred to as the B-side which includes the active hydrogen-containing materials and catalyst were added to a tank referred to as the polyol tank in the ratios indicated and mixed and maintained at the indicated temperature. The isocyanate component usually referred to as the A-side was added to an isocyanate tank in the indicated proportion and maintained at the indicated temperature. The machine and mold conditions employed to convert the components into a molded polyurethane are given in the following table.

TABLE

| Component, Condition, and Physical Property | Comp. Expt. A | Example 1 | Example 2 | Example 3 | Example 4 |
|---|---|---|---|---|---|
| Polyol B, pbw[1] | 100 | 75 | 50 | 25 | — |
| Polyol C, pbw[1] | — | 25 | 50 | 75 | 100 |
| Polyol D, pbw[1] | — | — | — | — | — |
| Chain Extender A, pbw[1] | 10 | 10 | 10 | 10 | 10 |
| Chain Extender B, pbw[1] | — | — | — | — | — |
| Polyisocyanate A, pbw[1] | 56.55 | 61.73 | 66.89 | 72.06 | 77.24 |
| Catalyst A, %[2] | 0.10 | 0.10 | 0.05 | 0.05 | 0.05 |
| Catalyst B, %[2] | 0.10 | 0.10 | 0.05 | 0.05 | 0.05 |
| Catalyst C, %[2] | — | — | — | — | — |
| NCX INDEX[5] | 1.03 | 1.03 | 1.03 | 1.03 | 1.03 |
| MOLD Temp., | | | | | |
| °F. | 159 | 160 | 156 | 159 | 159 |
| °C. | 70.5 | 71.1 | 68.9 | 70.5 | 70.5 |
| Polyol pressure, psi | 2,000 | 2,000 | 2,000 | 2,000 | 2,000 |
| Polyol pressure, bar | — | — | — | — | — |
| Polyol pressure, kPa | 13,790 | 13,790 | 13,790 | 13,790 | 13,790 |
| Isocyanate pressure, psi | 2,000 | 2,000 | 2,000 | 2,000 | 2,000 |
| Isocyanate pressure, bar | — | — | — | — | — |
| Isocyanate pressure, kPa | 13,790 | 13,790 | 13,790 | 13,790 | 13,790 |
| Polyol Temp., | | | | | |
| °F. | 98 | 104 | 84 | 84 | 82 |
| °C. | 36.7 | 40.0 | 28.9 | 28.9 | 27.8 |
| Polyisocyanate Temp., | | | | | |
| °F. | 96 | 100 | 88 | 86 | 86 |
| °C. | 35.6 | 37.8 | 31.1 | 30.0 | 30.0 |
| Through-put, g/sec. | 206 | 239 | 243 | 246 | 248 |
| Machine | ADMIRAL[4] | ADMIRAL[4] | ADMIRAL[4] | ADMIRAL[4] | ADMIRAL[4] |
| Post Cure Temp., | | | | | |
| °F. | 250 | 250 | 250 | 250 | 250 |
| °C. | 121.1 | 121.1 | 121.1 | 121.1 | 121.1 |
| Post Cure Time, | | | | | |
| min. | 60 | 60 | 60 | 60 | 60 |
| sec. | 3600 | 3600 | 3600 | 3600 | 3600 |
| Tensile Strength, | | | | | |
| psi | 1523 | 2471 | 2513 | 2906 | 2815 |
| kPa | 10,500 | 17,037 | 17,326 | 20,036 | 19,408 |
| Elongation, % | 198 | 278 | 262 | 294 | 274 |
| Flexural Modulus, | | | | | |
| psi | 3,338 | 5,387 | 6,140 | 7,583 | 8,371 |
| kPa | 23,014 | 37,142 | 42,333 | 52,283 | 57,716 |
| Die C Tear Strength, | | | | | |
| pli | 262 | 372 | 377 | 466 | 485 |
| kg/m | 4,678 | 6,642 | 6,731 | 8,267 | 8,660 |

| Component, Condition, and Physical Property | Comp. Expt. B | Example 5 | Example 6 | Example 7 | Example 8 |
|---|---|---|---|---|---|
| Polyol B, pbw[1] | 100 | 75 | 50 | 25 | — |
| Polyol C, pbw[1] | — | 25 | 50 | 75 | 100 |

TABLE-continued

| Component, Condition, and Physical Property | | | | | |
|---|---|---|---|---|---|
| Polyol D, pbw[1] | — | — | — | — | — |
| Chain Extender A, pbw[1] | 20 | 20 | 20 | 20 | 20 |
| Chain Extender B, pbw[1] | — | — | — | — | — |
| Polyisocyanate A, pbw[1] | 104.24 | 109.41 | 114.57 | 119.74 | 124.92 |
| Catalyst A, %[2] | 0.15 | 0.05 | 0.05 | 0.05 | 0.05 |
| Catalyst B, %[2] | 0.10 | 0.05 | 0.05 | 0.05 | 0.05 |
| Catalyst C, %[2] | — | — | — | — | — |
| NCX INDEX[5] | 1.03 | 1.03 | 1.03 | 1.03 | 1.03 |
| MOLD Temp., | | | | | |
| °F. | 170 | 161 | 158 | 159 | 158 |
| °C. | 76.7 | 71.7 | 70.0 | 70.6 | 70.0 |
| Polyol pressure, psi | 2,000 | 2,000 | 2,000 | 2,000 | 2,000 |
| Polyol pressure, bar | — | — | — | — | — |
| Polyol pressure, kPa | 13,790 | 13,790 | 13,790 | 13,790 | 13,790 |
| Isocyanate pressure, psi | 2,000 | 2,000 | 2,000 | 2,000 | 2,000 |
| Isocyanate pressure, bar | — | — | — | — | — |
| Isocyanate pressure, kPa | 13,790 | 13,790 | 13,790 | 13,790 | 13,790 |
| Polyol Temp., | | | | | |
| °F. | 100 | 104 | 85 | 86 | 88 |
| °C. | 37.8 | 40.0 | 29.4 | 30.0 | 31.1 |
| Polyisocyanate Temp., | | | | | |
| °F. | 98 | 100 | 88 | 87 | 90 |
| °C. | 36.7 | 37.8 | 31.1 | 30.6 | 32.2 |
| Through-put, g/sec. | 254 | 289 | 296 | 301 | 298 |
| Machine | ADMIRAL[4] | ADMIRAL[4] | ADMIRAL[4] | ADMIRAL[4] | ADMIRAL[4] |
| Post Cure Temp., | | | | | |
| °F. | 250 | 250 | 250 | 250 | 250 |
| °C. | 121.1 | 121.1 | 121.1 | 121.1 | 121.1 |
| Post Cure Time, | | | | | |
| min. | 60 | 60 | 60 | 60 | 60 |
| sec. | 3600 | 3600 | 3600 | 3600 | 3600 |
| Tensile Strength, | | | | | |
| psi | 3104 | 4017 | 4093 | 4344 | 4302 |
| kPa | 21,401 | 27,696 | 28,220 | 29,950 | 29,661 |
| Elongation, % | 210 | 256 | 236 | 224 | 190 |
| Flexural Modulus, | | | | | |
| psi | 24,513 | 35,926 | 35,981 | 45,608 | 49,900 |
| kPa | 169,011 | 247,702 | 248,081 | 314,457 | 344,049 |
| Die C Tear Strength, | | | | | |
| pli | 559 | 657 | 669 | 749 | 747 |
| kg/m | 9,981 | 11,731 | 11,946 | 13,374 | 13,338 |

| Component, Condition, and Physical Property | Example or Comparative Experiment | | | | |
|---|---|---|---|---|---|
| | Comp. Expt. C | Example 9 | Example 10 | Example 11 | Example 12 |
| Polyol B, pbw[1] | 100 | 75 | 50 | 25 | — |
| Polyol C, pbw[1] | — | 25 | 50 | 75 | 100 |
| Polyol D, pbw[1] | — | — | — | — | — |
| Chain Extender A, pbw[1] | 30 | 30 | 30 | 30 | 30 |
| Chain Extender B, pbw[1] | — | — | — | — | — |
| Polyisocyanate A, pbw[1] | 151.9 | 157.09 | 162.25 | 162.54 | 167.57 |
| Catalyst A, %[2] | 0.15 | 0.10 | 0.075 | 0.05 | 0.05 |
| Catalyst B, %[2] | 0.10 | 0.10 | 0.05 | 0.05 | 0.05 |
| Catalyst C, %[2] | — | — | — | — | — |
| NCX INDEX[5] | 1.03 | 1.03 | 1.03 | 1.03 | 1.03 |
| MOLD Temp., | | | | | |
| °F. | 169 | 156 | 157 | 159 | 158 |
| °C. | 76.1 | 68.9 | 69.4 | 70.6 | 70.0 |
| Polyol pressure, psi | 2,000 | 2,000 | 2,000 | 2,000 | 2,000 |
| Polyol pressure, bar | — | — | — | — | — |
| Polyol pressure, kPa | 13,790 | 13,790 | 13,790 | 13,790 | 13,790 |
| Isocyanate pressure, psi | 2,000 | 2,000 | 2,000 | 2,000 | 2,000 |
| Isocyanate pressure, bar | — | — | — | — | — |
| Isocyanate pressure, kPa | 13,790 | 13,790 | 13,790 | 13,790 | 13,790 |
| Polyol Temp., | | | | | |
| °F. | 104 | 88 | 79 | 87 | 88 |
| °C. | 40.0 | 31.1 | 26.1 | 30.6 | 31.1 |
| Polyisocyanate Temp., | | | | | |
| °F. | 100 | 92 | 84 | 89 | 90 |
| °C. | 37.8 | 33.3 | 28.9 | 31.7 | 32.2 |
| Through-put, g/sec. | 272 | 273 | 269 | 265 | 270 |
| Machine | ADMIRAL[4] | ADMIRAL[4] | ADMIRAL[4] | ADMIRAL[4] | ADMIRAL[4] |
| Post Cure Temp., | | | | | |
| °F. | 250 | 250 | 250 | 250 | 250 |
| °C. | 121.1 | 121.1 | 121.1 | 121.1 | 121.1 |
| Post Cure Time, | | | | | |
| min. | 60 | 60 | 60 | 60 | 60 |
| sec. | 3600 | 3600 | 3600 | 3600 | 3600 |

TABLE-continued

| Tensile Strength, | | | | | |
|---|---|---|---|---|---|
| psi | 3931 | 3965 | 4600 | 5094 | 4858 |
| kPa | 27,103 | 27,337 | 31,716 | 35,122 | 33,494 |
| Elongation, % | 170 | 120 | 140 | 170 | 140 |
| Flexural Modulus, | | | | | |
| psi | 58,073 | 74,215 | 84,456 | 94,008 | 101,457 |
| kPa | 400,400 | 511,696 | 582,305 | 648,164 | 699,524 |
| Die C Tear Strength, | | | | | |
| pli | 716 | 752 | 898 | 934 | 911 |
| kg/m | 12,785 | 13,428 | 16,035 | 16,678 | 16,267 |

| Component, Condition, and Physical Property | Example or Comparative Experiment | | | | |
|---|---|---|---|---|---|
| | Comp. Expt. D | Example 13 | Example 14 | Example 15 | Example 16 |
| Polyol B, pbw[1] | 100 | 75 | 50 | 25 | — |
| Polyol C, pbw[1] | — | 25 | 50 | 75 | 100 |
| Polyol D, pbw[1] | — | — | — | — | — |
| Chain Extender A, pbw[1] | 20 | 20 | 20 | 20 | 20 |
| Chain Extender B, pbw[1] | — | — | — | — | — |
| Polyisocyanate A, pbw[1] | 91.89 | 96.46 | 101.01 | 105.56 | 110.14 |
| Catalyst A, %[2] | 0.10 | 0.10 | 0.05 | 0.05 | 0.05 |
| Catalyst B, %[2] | 0.10 | 0.10 | 0.05 | 0.05 | 0.05 |
| Catalyst C, %[2] | — | — | — | — | — |
| NCX INDEX[5] | 0.91 | 0.91 | 0.91 | 0.91 | 0.91 |
| MOLD Temp., | | | | | |
| °F. | 144 | 162 | 158 | 156 | 158 |
| °C. | 62.2 | 72.2 | 70.0 | 68.9 | 70.0 |
| Polyol pressure, psi | 2,000 | 2,000 | 2,000 | 2,000 | 2,000 |
| Polyol pressure, bar | — | — | — | — | — |
| Polyol pressure, kPa | 13,790 | 13,790 | 13,790 | 13,790 | 13,790 |
| Isocyanate pressure, psi | 2,000 | 2,000 | 2,000 | 2,000 | 2,000 |
| Isocyanate pressure, bar | — | — | — | — | — |
| Isocyanate pressure, kPa | 13,790 | 13,790 | 13,790 | 13,790 | 13,790 |
| Polyol Temp., | | | | | |
| °F. | 98 | 102 | 85 | 85 | 85 |
| °C. | 36.7 | 38.9 | 29.4 | 29.4 | 29.4 |
| Polyisocyanate Temp., | | | | | |
| °F. | 96 | 100 | 88 | 87 | 87 |
| °C. | 35.6 | 37.8 | 31.1 | 30.6 | 30.6 |
| Through-put, g/sec. | 257 | 290 | 279 | 279 | 285 |
| Machine | ADMIRAL[4] | ADMIRAL[4] | ADMIRAL[4] | ADMIRAL[4] | ADMIRAL[4] |
| Post Cure Temp., | | | | | |
| °F. | 250 | 250 | 250 | 250 | 250 |
| °C. | 121.1 | 121.1 | 121.1 | 121.1 | 121.1 |
| Post Cure Time, | | | | | |
| min. | 60 | 60 | 60 | 60 | 60 |
| sec. | 3600 | 3600 | 3600 | 3600 | 3600 |
| Tensile Strength, | | | | | |
| psi | 2989 | 3435 | 4078 | 4106 | 4424 |
| kPa | 20,608 | 23,683 | 28,116 | 28,309 | 30,502 |
| Elongation, % | 210 | 252 | 268 | 422 | 276 |
| Flexural Modulus, | | | | | |
| psi | 14,614 | 26,689 | 29,900 | 37,528 | 38,962 |
| kPa | 100,760 | 184,014 | 206,154 | 258,747 | 268,634 |
| Die C Tear Strength, | | | | | |
| pli | 446 | 562 | 676 | 759 | 786 |
| kg/m | 7,964 | 10,035 | 12,071 | 13,553 | 14,035 |

| Component, Condition, and Physical Property | Example or Comparative Experiment | | | | |
|---|---|---|---|---|---|
| | Comp. Expt. E | Example 17 | Example 18 | Example 19 | Example 20 |
| Polyol B, pbw[1] | 100 | 75 | 50 | 25 | — |
| Polyol C, pbw[1] | — | 25 | 50 | 75 | 100 |
| Polyol D, pbw[1] | — | — | — | — | — |
| Chain Extender A, pbw[1] | 30 | 30 | 30 | 30 | 30 |
| Chain Extender B, pbw[1] | — | — | — | — | — |
| Polyisocyanate A, pbw[1] | 138.92 | 143.65 | 148.37 | 153.10 | 157.81 |
| Catalyst A, %[2] | 0.15 | 0.10 | 0.05 | 0.05 | 0.05 |
| Catalyst B, %[2] | 0.10 | 0.10 | 0.05 | 0.05 | 0.05 |
| Catalyst C, %[2] | — | — | — | — | — |
| NCX INDEX[5] | 0.94 | 0.94 | 0.94 | 0.94 | 0.94 |
| MOLD Temp., | | | | | |
| °F. | 170 | 156 | 157 | 159 | 158 |
| °C. | 76.7 | 68.9 | 69.4 | 70.6 | 70.0 |
| Polyol pressure, psi | 2,000 | 2,000 | 2,000 | 2,000 | 2,000 |
| Polyol pressure, bar | — | — | — | — | — |
| Polyol pressure, kPa | 13,790 | 13,790 | 13,790 | 13,790 | 13,790 |

| | | | | | |
|---|---|---|---|---|---|
| Isocyanate pressure, psi | 2,000 | 2,000 | 2,000 | 2,000 | 2,000 |
| Isocyanate pressure, bar | — | — | — | — | — |
| Isocyanate pressure, kPa | 13,790 | 13,790 | 13,790 | 13,790 | 13,790 |
| Polyol Temp., | | | | | |
| °F. | 100 | 88 | 84 | 86 | 88 |
| °C. | 37.8 | 31.1 | 28.9 | 30.0 | 31.1 |
| Polyisocyanate Temp., | | | | | |
| °F. | 98 | 92 | 86 | 84 | 90 |
| °C. | 36.7 | 33.3 | 30.0 | 28.9 | 32.2 |
| Through-put, g/sec. | 283 | 282 | 282 | 270 | 277 |
| Machine | ADMIRAL[4] | ADMIRAL[4] | ADMIRAL[4] | ADMIRAL[4] | ADMIRAL[4] |
| Post Cure Temp., | | | | | |
| °F. | 250 | 250 | 250 | 250 | 250 |
| °C. | 121.1 | 121.1 | 121.1 | 121.1 | 121.1 |
| Post Cure Time, | | | | | |
| min. | 60 | 60 | 60 | 60 | 60 |
| sec. | 3600 | 3600 | 3600 | 3600 | 3600 |
| Tensile Strength, | | | | | |
| psi | 3560 | 3742 | 4468 | 5093 | 4857 |
| kPa | 24,545 | 25,800 | 30,805 | 35,115 | 33,487 |
| Elongation, % | 170 | 130 | 170 | 216 | 150 |
| Flexural Modulus, | | | | | |
| psi | 47,971 | 66,101 | 80,582 | 92,051 | 95,035 |
| kPa | 330,749 | 455,752 | 555,595 | 634,671 | 655,245 |
| Die C Tear Strength, | | | | | |
| pli | 637 | 716 | 912 | 972 | 1027 |
| kg/m | 11,374 | 12,785 | 16,285 | 17,356 | 18,338 |

| Component, Condition, and Physical Property | Example or Comparative Experiment | | | | | |
|---|---|---|---|---|---|---|
| | Comp. Expt. F | Example 21 | Comp. Expt. G | Example 22 | Comp. Expt. H | Example 23 |
| Polyol B, pbw[1] | — | — | — | — | — | — |
| Polyol C, pbw[1] | — | 100 | — | 100 | — | 100 |
| Polyol D, pbw[1] | 100 | — | 100 | — | 100 | — |
| Chain Extender A, pbw[1] | 20 | 20 | 30 | 30 | — | — |
| Chain Extender B, pbw[1] | — | — | — | — | 22 | 22 |
| Polyisocyanate A, pbw[1] | 110.14 | 124.92 | 157.80 | 167.57 | 51.32 | 59.94 |
| Catalyst A, %[2] | 0.20 | 0.05 | 0.20 | 0.05 | 0.20 | 0 |
| Catalyst B, %[2] | 0.10 | 0.05 | 0.10 | 0.05 | — | 0 |
| Catalyst C, %[2] | 0.20 | — | 0.20 | — | 0.10 | 0 |
| NCX INDEX[5] | 1.03 | 1.03 | 1.03 | 1.03 | 0.60 | 0.60 |
| MOLD Temp., | | | | | | |
| °F. | 160 | 158 | 160 | 158 | 160 | 160 |
| °C. | 71.1 | 70.0 | 71.1 | 70.0 | 71.1 | 71.1 |
| Polyol pressure, psi | — | 2,000 | — | 2,000 | — | — |
| Polyol pressure, bar | 150 | — | 150 | — | 150 | 150 |
| Polyol pressure, kPa | — | — | — | — | — | — |
| Isocyanate pressure, psi | — | 2,000 | — | 2,000 | — | — |
| Isocyanate pressure, bar | 150 | — | 150 | — | 150 | 150 |
| Isocyanate pressure, kPa | 15,000 | 13,790 | 15,000 | 13,790 | 15,000 | 15,000 |
| Polyol Temp., | | | | | | |
| °F. | 107 | 88 | 103 | 88 | 90 | 100 |
| °C. | 41.7 | 31.1 | 39.4 | 31.1 | 32.2 | 37.8 |
| Polyisocyanate Temp., | | | | | | |
| °F. | 96 | 90 | 92 | 90 | 100 | 103 |
| °C. | 35.6 | 32.2 | 33.3 | 32.2 | 37.8 | 39.4 |
| Through-put, g/sec. | 1000 | 298 | 1000 | 270 | 1000 | 1000 |
| Machine | KM[3] | ADMIRAL[4] | KM[3] | ADMIRAL[4] | KM[3] | KM[3] |
| Post Cure Temp., | | | | | | |
| °F. | 250 | 250 | 250 | 250 | 250 | 250 |
| °C. | 121.1 | 121.1 | 121.1 | 121.1 | 121.1 | 121.1 |
| Post Cure Time, | | | | | | |
| min. | 60 | 60 | 60 | 60 | 60 | 60 |
| sec. | 3600 | 3600 | 3600 | 3600 | 3600 | 3600 |
| Tensile Strength, | | | | | | |
| psi | 3206 | 4302 | 3107 | 4858 | 1724 | 4525 |
| kPa | 22,104 | 29,661 | 21,422 | 33,494 | 11,886 | 31,198 |
| Elongation, % | 200 | 190 | 96 | 140 | 255 | 272 |
| Flexural Modulus, | | | | | | |
| psi | 15,116 | 49,900 | 37,382 | 101,457 | 9,236 | 40,072 |
| kPa | 104,221 | 344,049 | 257,740 | 699,524 | 63,680 | 276,287 |
| Die C Tear Strength, | | | | | | |
| pli | 453 | 747 | 433 | 911 | 366 | 773 |
| kg/m | 8,089 | 13,338 | 7,731 | 16,267 | 6,535 | 13,803 |

| Component, Condition, and Physical | Example or Comparative Experiment | | | |
|---|---|---|---|---|
| | Comp. Expt. | Example | Example | Example |

TABLE-continued

| Property | I | 24 | 25 | 26 |
|---|---|---|---|---|
| Polyol E, pbw[1] | — | — | — | 100 |
| Polyol F, pbw[1] | — | 100 | — | — |
| Polyol G, pbw[1] | — | — | 100 | — |
| Polyol H, pbw[1] | 100 | — | — | — |
| Chain Extender A, pbw[1] | — | — | — | — |
| Chain Extender B, pbw[1] | 18 | 18 | 18 | 18 |
| Polyisocyanate B, pbw[1] | 48.6 | 48.6 | 48.6 | 55.2 |
| Catalyst A, %[2] | 0.10 | 0.10 | 0.10 | — |
| Catalyst B, %[2] | 0.10 | — | — | — |
| Catalyst C, %[2] | — | — | — | — |
| Catalyst D, %[2] | — | 0.10 | 0.10 | — |
| NCX INDEX[5] | 1.03 | 0.98 | 0.93 | 1.03 |
| MOLD Temp., | | | | |
| °F. | 145 | 145 | 145 | 145 |
| °C. | 62.7 | 62.7 | 62.7 | 62.7 |
| Polyol pressure, psi | 2,000 | 2,000 | 2,000 | 2,400 |
| Polyol pressure, bar | — | — | — | — |
| Polyol pressure, kPa | 13,790 | 13,790 | 13,790 | 16,552 |
| Isocyanate pressure, psi | 2,000 | 2,000 | 2,000 | 2,400 |
| Isocyanate pressure, bar | — | — | — | — |
| Isocyanate pressure, kPa | 13,790 | 13,790 | 13,790 | 16,552 |
| Polyol Temp., | | | | |
| °F. | 100 | 100 | 100 | 124 |
| °C. | 37.8 | 37.8 | 37.8 | 51.1 |
| Polyisocyanate Temp., | | | | |
| °F. | 100 | 100 | 100 | 122 |
| °C. | 37.8 | 37.8 | 37.8 | 50 |
| Through-put, g/sec. | 215 | 206 | 207 | 215 |
| Machine | ADMIRAL[4] | ADMIRAL[4] | ADMIRAL[4] | ADMIRAL[4] |
| Post Cure Temp., | | | | |
| °F. | 250 | 250 | 250 | 250 |
| °C. | 121.1 | 121.1 | 121.1 | 121.1 |
| Post Cure Time, | | | | |
| min. | 60 | 60 | 60 | 60 |
| sec. | 3600 | 3600 | 3600 | 3600 |
| Tensile Strength, | | | | |
| psi | 2532 | 2815 | 2466 | 3375 |
| kPa | 17,462 | 19,828 | 17,007 | 23,276 |
| Elongation, % | 278 | 488 | 320 | 320 |
| Flexural Modulus, | | | | |
| psi | 9,312 | 11,544 | 15,515 | 19,814 |
| kPa | 64,221 | 79,614 | 107,000 | 136,648 |
| Die C Tear Strength, | | | | |
| pli | 378 | 512 | 500 | 418 |
| kg/m | 6,756 | 9,151 | 8,937 | 7,471 |

FOOTNOTES TO TABLE
[1] pbw is parts by weight.
[2] catalyst is % by weight of the combined quantity of the polyols and chain extenders employed.
[3] KM means that a Krausse Maffei machine model PU-400/80-2F was employed.
[4] Admiral means that an Admiral model 400-2HP machine was employed.
[5] The NCX index is the NCX equivalents divided by the sum of the total amine hydrogen equivalents plus the hydroxyl equivalents.

We claim:

1. In a process for preparing molded polymer systems which systems employ a composition which comprises
(A) at least one relatively high molecular weight hydroxyl-containing polyol;
(B) at least one chain extender; and
(C) at least one polyisocyanate, polyisothiocyanate or mixture thereof;
the improvement which comprises replacing at least a portion of component (A) with
(D) a material or mixture of materials having an average equivalent weight of at least 500 and which contains a plurality of oxyalkylene groups and at least one primary or secondary amine group per molecule with the proviso that when such material contains only one primary or secondary amine group per molecule, it also contains at least one other group containing a hydrogen atom reactive with NCO and/or NCS group per molecule; and wherein
(i) of the total number of hydrogen equivalents contributed by hydroxyl groups and amine groups in components (A) and (D), from about 25 to about 100 percent of such hydrogen equivalents are derived from amine groups; and
(ii) the NCX index is from about 0.6 to about 1.5 with the proviso that when the system contains an NCX trimerization catalyst, the NCX index can be as high as about 5.

2. A process of claim 1 wherein
(i) component (A) is a polyether polyol having an average hydroxyl functionality of from about 2 to about 8 and an average hydroxyl equivalent weight of from about 500 to about 5000;
(ii) component (B) is selected from the group consisting of
(1) hydroxyl-containing materials which are essentially free of aliphatic amine hydrogen atoms, have an average OH functionality of from about 2 to about 4 and have an average OH equivalent weight of from about 30 to about 120; and
(2) aromatic amine-containing materials which are essentially free of aliphatic amine hydrogen atoms and which contain at least two aromatic amine hydrogen atoms;
(3) aliphatic amine-containing materials having at least one primary amine group, an average aliphatic amine hydrogen functionality of from about 2 to about 16 and an average aliphatic amine hydrogen equivalent weight of from about 15 to less than about 500; and
(4) mixtures thereof;
(iii) component (C) is a polyisocyanate;
(iv) component (D) is an aminated or partially aminated polyoxyalkylene diol or triol having an average equivalent weight of from greater than 500 to about 3,000;
(v) component (B) is present in quantities of from about 5 to about 60 parts per 100 parts by weight of the combined weight of components (A) and (D);
(vi) component (D) is present in quantities such that from about 50 to about 100 percent of the hydrogen equivalents contained in components (A) and (D) are contributed by amine groups; and
(vii) the NCX index is from about 0.7:1 to about 1.25:1.

3. A process of claim 2 wherein
(i) component (A) has an average functionality of from about 2 to about 4 and an average hydroxyl equivalent weight of from about 1000 to about 3000;
(ii) component (B) is present in quantities of from about 15 to about 50 parts per 100 parts by weight of the combined weight of components (A) and (D); and
(iii) component (D) is an aminated or partially aminated polyoxyalkylene glycol having, before amination, an average equivalent weight of from 500 to about 2,000;
(iv) component (D) is present in quantities such that from about 60 to about 100 percent of the hydrogen equivalents contained in components (A) and (D) are contributed by amine groups; and
(v) the NCX index is from about 0.8:1 to about 1.10:1.

4. A process of claim 3 wherein component (A) has an average hydroxyl functionality of from about 2 to about 3 and an average hydroxyl equivalent weight of from about 1500 to about 2500 and component (B) is present in quantities of from about 20 to about 40 parts per 100 parts by weight of the combined weight of components (A) and (D).

5. A process of claims 1, 2, 3 or 4 wherein
(i) component (A) is a polyoxyalkylene glycol or a glycerine or trimethylolpropane initiated polyoxyalkylenepolyol or a hydrocarbon polyol;
(ii) component (B) is ethylene glycol, diethylene glycol, propylene glycol, dipropylene glycol, 1,4-butane diol, a polymethylenepolyphenylamine having a functionality of from 2 to about 5, 1-methyl-3,5-diethyl-2,4-diaminobenzene, 1-methyl-3,5-diethyl-2,6-diaminobenzene, 3,5,3',5'-tetraethyl-4,4'-diaminodiphenylmethane, 2,4-bis(p-aminobenzyl)aniline, an aminated polyoxypropylene glycol having an average amine hydrogen equivalent weight of from about 60 to about 110, or mixture thereof; and
(iii) component (C) is a liquid, modified diphenylmethane diisocyanate quasi-prepolymer of diphenylmethane diisocyanate, quasi-prepolymer of modified diphenylmethane diisocyanate, quasi-prepolymer of toluene diisocyanate or mixture thereof and wherein the average NCO equivalent weight is from about 140 to about 200.

6. A composition comprising
(A) an active hydrogen-containing composition comprising
(1) at least one material containing at least one primary or secondary amine group per molecule and has an average equivalent weight of at least about 500; and
(2) optionally a polyol or mixture of polyols whose source of active hydrogen atoms is derived only from groups other than primary or secondary amine groups, has an average active hydrogen equivalent weight of at least 500; with the proviso that if polyol (A-1) has only one primary or secondary amine group per molecule, then it also has at least one other group reactive with an NCO and/or NCS group per molecule and wherein in component (A) from about 25 to about 100 percent of the active hydrogen equivalents contained therein are derived from amine groups; and
(B) as a chain extender composition, one or more members selected from
(1) an aliphatic amine-containing material having at least one primary amine group or a mixture of such materials, which material or mixture of materials has an average aliphatic amine hydrogen functionality of from about 2 to about 16, and an average aliphatic amine hydrogen equivalent weight of from about 15 to about 500;
(2) a hydroxyl-containing material free of aliphatic amine hydrogen atoms or mixture of such materials, which material or material mixture has an average OH functionality of from about 2 to about 4, and an average OH equivalent weight of from about 30 to about 120;
(3) an aromatic amine-containing compound which is essentially free of aliphatic amine hydrogens and which contains at least 2 aromatic amine hydrogen atoms or a mixture of such materials;
(4) mixtures thereof; and wherein
(i) when component (B) has an average equivalent weight of less than about 50, component (B) is present in quantities of from about 5 to about 60, percent by weight of component (A);
(ii) when component (B) has an average equivalent weight of from about 50 to about 150, component (B) is present in quantities of from about 5 to about 90, percent by weight of component (A);
(iii) when component (B) has an average equivalent weight of greater than about 150, component (B) is present in quantities of from about 5 to about 120, percent by weight of component (A); and
(iv) equivalent weight is the average molecular weight divided by the total number of hydrogen atoms attached to an oxygen atom or a nitrogen atom.

7. A composition of claim 6 wherein
(1) component (A-1) has an average equivalent weight of from 500 to about 3000;
(2) component (A-2) is a polyether polyol or mixture of polyether polyols, which polyol or polyol mixture has an average hydroxyl functionality of from about 3 to about 8 and an average hydroxyl equivalent weight of from about 500 to about 5,000;
(3) component (B-1) is an aliphatic amine-containing material or a mixture of such materials, which material or material mixture has an average aliphatic amine hydrogen functionality of from about 2 to about 12 and an average aliphatic amine hydrogen equivalent weight of from about 50 to about 200;

(4) component (B-2) has an average hydroxyl functionality of from about 2 to about 3 and an average hydroxyl equivalent weight of from about 30 to about 70;

(5) from about 50 to about 100 percent of the hydrogen equivalents in component (A) is derived from amine groups;

(6) when component (B) has an average equivalent weight of less than about 50, component (B) is present in quantities of from about 15 to about 50 percent by weight of component (A);

(7) when component (B) has an average equivalent weight of from about 50 to about 150, component (B) is present in quantities of from about 15 to about 70 percent by weight of component (A);

(8) when component (B) has an average equivalent weight of greater than about 150, component (B) is present in quantities of from about 15 to about 100 percent by weight of component (A); and (9) equivalent weight is the average molecular weight divided by the total number of hydrogen atoms attached to an oxygen atom or a nitrogen atom.

8. A composition of claim 7 wherein (1) component (A-1) has an average equivalent weight of from 500 to about 2000;

(2) component (A-2) has an average functionality of from about 3 to about 4 and an average hydroxyl equivalent weight of from about 1000 to about 3000;

(3) component (B-1) has an average aliphatic amine hydrogen functionality of from about 4 to about 8 and an average aliphatic amine hydrogen equivalent weight of from about 80 to about 150;

(4) component (B-2) has an average functionality of about 2 and an average hydroxyl equivalent weight of from about 30 to about 50;

(5) from about 60 to about 100 percent of the hydrogen equivalents in component (A) is derived from amine groups;

(6) when component (B) has an average equivalent weight of less than about 50, component (B) is present in quantities of from about 20 to about 40 percent by weight of component (A);

(7) when component (B) has an average equivalent weight of from about 50 to about 150, component (B) is present in quantities of from about 20 to about 55 percent by weight of component (A);

(8) when component (B) has an average equivalent weight of greater than about 150, component (B) is present in quantities of from about 20 to about 85 percent by weight of component (A); and (9) wherein equivalent weight is the average molecular weight divided by the total number of hydrogen atoms attached to an oxygen atom or a nitrogen atom.

9. A composition of claim 8 wherein (1) component (A-2) has an average functionality of from about 3 to about 4 and an average hydroxyl equivalent weight of from about 1500 to about 2500;

(2) component (B-1) has an average aliphatic amine hydrogen functionality of from about 4 to about 8 and an average aliphatic amine hydrogen equivalent weight of from about 80 to about 150.

10. A composition of claims 6, 7, 8 or 9 wherein (1) component (A-2) is a glycerine and/or trimethylolpropane initiated polyoxyalkylenepolyol; and (2) component (B-1) is an aminated polyoxypropylene glycol having an average amine hydrogen equivalent weight of from about 60 to about 110.

11. A composition of claims 6, 7, 8 or 9 wherein (1) component (A-2) is a glycerine and/or trimethylolpropane initiated polyoxyalkylenepolyol;

(2) component (A-1) is an aminated glycerine and/or trimethylolpropane initiated polyoxyalkylenepolyol;

(3) component (B) is a mixture of an aminated polyoxypropylene glycol having an average amine hydrogen equivalent weight of from about 60 to about 110 and ethylene glycol.

12. A composition of claims 6, 7, 8 or 9 wherein (1) component (A-1) is an aminated glycerine and/or trimethylolpropane initiated polyoxyalkylenepolyol;

(2) component (A-2) is a glycerine and/or trimethylolpropane initiated polyoxyalkylenepolyol;

(3) component (B) is a mixture of an aminated polyoxypropylene glycol having an average amine hydrogen equivalent weight of from about 60 to about 110 and a polymethylene polyphenyl amine containing major quantities of 2,4-bis(p-aminobenzyl)aniline.

13. A composition of claims 6, 7, 8 or 9 wherein component (A-1) has an average equivalent weight of greater than 500.

14. A composition of claim 10 wherein component (A-1) has an average equivalent weight of greater than 500.

15. A composition of claim 11 wherein component (A-1) has an average equivalent weight of greater than 500.

16. A composition of claim 12 wherein component (A-1) has an average equivalent weight of greater than 500.

17. A composition of claims 6, 7, 8, 9, 10, 11 or 12 which additionally contains minor quantities of one or more of any combination of cell control agents, fire retardant agents, mold release agents, blowing agents or coloring agents.

18. A composition of claim 10 which additionally contains minor quantities of one or more of any combination of cell control agents, fire retardant agents, mold release agents, blowing agents or coloring agents.

19. A composition of claim 11 which additionally contains minor quantities of one or more of any combination of cell control agents, fire retardant agents, reinforcing agents, mold release agents, blowing agents or coloring agents.

20. A composition of claim 12 which additionally contains minor quantities of one or more of any combination of cell control agents, fire retardant agents, mold release agents, blowing agents or coloring agents.

21. A composition of claim 13 which additionally contains minor quantities of one or more of any combination of cell control agents, fire retardant agents, mold release agents, blowing agents or coloring agents.

22. A composition of claim 14 which additionally contains minor quantities of one or more of any combination of cell control agents, fire retardants agents, mold release agents, blowing agents or coloring agents.

23. A composition of claim 15 which additionally contains minor quantities of one or more of any combination of cell control agents, fire retardant agents, mold release agents, blowing agents or coloring agents.

24. A composition of claim 16 which additionally contains minor quantities of one or more of any combination of cell control agents, fire retardant agents, mold release agents, blowing agents or coloring agents.

* * * * *